US012737757B2

(12) United States Patent
Mohammed et al.

(10) Patent No.: US 12,737,757 B2
(45) **Date of Patent: *Sep. 15, 2026**

(54) SYSTEMS AND METHODS FOR REAL-TIME IDENTIFICATION OF AN ANOMALY OF A BLOCK TRANSACTIONS GRAPH OF A BLOCKCHAIN

(71) Applicant: U.S. Bank, Minneapolis, MN (US)

(72) Inventors: Ahmed Mohammed Abdelrahman Mohammed, Dallas, TX (US); Samuel Ayalew Assefa, Boston, MA (US); Michael Jude Villano, Laguna Niguel, CA (US)

(73) Assignee: U.S. Bank, Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/319,058

(22) Filed: Sep. 4, 2025

(65) Prior Publication Data

US 2026/0004292 A1 Jan. 1, 2026

Related U.S. Application Data

(63) Continuation of application No. 17/987,349, filed on Nov. 15, 2022, now Pat. No. 12,430,642.

(51) Int. Cl.
*G06Q 20/38* (2012.01)
*G06N 3/042* (2023.01)
(Continued)

(52) U.S. Cl.
CPC .......... *G06Q 20/389* (2013.01); *G06N 3/042* (2023.01); *G06Q 20/3827* (2013.01); *G06Q 20/4016* (2013.01); *H04L 9/50* (2022.05)

(58) Field of Classification Search
CPC .. G06Q 20/389; G06Q 20/4016; G06N 3/042; H04L 9/50
See application file for complete search history.

(56) References Cited

U.S. PATENT DOCUMENTS

2017/0140382 A1* 5/2017 Chari .................. G06Q 20/389
2020/0026805 A1 1/2020 Dasgupta et al.
(Continued)

FOREIGN PATENT DOCUMENTS

CN 111698247 A 9/2020
CN 112435122 A 3/2021
(Continued)

OTHER PUBLICATIONS

R. Tan, Q. Tan, P. Zhang and Z. Li, "Graph Neural Network for Ethereum Fraud Detection," 2021 IEEE International Conference on Big Knowledge (ICBK), Auckland, New Zealand, 2021, pp. 78-85, doi: 10.1109/ICKG52313.2021.00020. (Year: 2021).*
(Continued)

*Primary Examiner* — John W Hayes
*Assistant Examiner* — Taylor S Rak
(74) *Attorney, Agent, or Firm* — Merchant & Gould P.C.

(57) ABSTRACT

Systems and methods to identify blockchain anomalies include an AI tool comprising a processor, a GPU, and a GNN model to extract graph parameters from a block transactions graph of a blockchain block, generate statistical approximations of the graph based on the graph parameters, compare the statistical approximations to at least one anomaly threshold, detect an irregular graph pattern in the graph when the statistical approximations exceed the at least one anomaly threshold, identify via the GNN model an anomaly within the block transactions graph based on the irregular graph pattern, generate via the GPU an address graph based on the block transactions graph when the anomaly is identified to display one or more addresses associated with the anomaly, and generate an alert when the anomaly is identified.

16 Claims, 5 Drawing Sheets

(51) Int. Cl.

| | |
|---|---|
| ***G06Q 20/40*** | (2012.01) |
| ***H04L 9/00*** | (2022.01) |

(56) References Cited

U.S. PATENT DOCUMENTS

| | | | | |
|---|---|---|---|---|
| 2020/0167786 | A1* | 5/2020 | Kursun | H04L 63/08 |
| 2020/0364366 | A1* | 11/2020 | Kundu | G06N 3/04 |
| 2021/0067527 | A1* | 3/2021 | Chen | G06N 3/09 |
| 2021/0158161 | A1 | 5/2021 | Louizos | |
| 2021/0256355 | A1* | 8/2021 | Chen | G06N 3/047 |
| 2021/0390519 | A1* | 12/2021 | Taniguchi | G06Q 20/065 |
| 2024/0062041 | A1* | 2/2024 | Choudhary | G06N 3/042 |
| 2024/0086926 | A1* | 3/2024 | Tian | G06Q 20/4016 |
| 2024/0161106 | A1 | 5/2024 | Mohammed | |

FOREIGN PATENT DOCUMENTS

| | | | |
|---|---|---|---|
| CN | 112600810 | A | 4/2021 |
| CN | 113657896 | A | 11/2021 |
| CN | 113723954 | A | 11/2021 |
| CN | 114444074 | A | 5/2022 |
| CN | 114782159 | A | 7/2022 |

OTHER PUBLICATIONS

A. Sardana, O. Yilmaz, K. Kranen, “Optimizing Fraud Detection in Financial Services with Graph Neural Networks and Nvidia GPUs,” Oct. 4, 2022, Nvidia Technical Blog (Year: 2022).*

Lo et al., “Inspection-L: A Self-Supervised GNN-Based Money Laundering Detection System for Bitcoin”, https://arxiv.org/pdf/2203.10465.pdf, Apr. 25, 2022.

Shchur et al., “Overlapping community detection with graph neural networks”, arXiv preprint, 1909.12201, 2019.

Yu et al., “MP-GCN: A Phishing Nodes Detection Approach via Graph Convolution Network for Ethereum”, https://www.mdpi.com/2076-3417/12/14/7294, Jul. 20, 2022.

* cited by examiner

SYSTEMS AND METHODS FOR REAL-TIME IDENTIFICATION OF AN ANOMALY OF A BLOCK TRANSACTIONS GRAPH OF A BLOCKCHAIN

CROSS REFERENCE TO RELATED APPLICATIONS

This application claims priority to and is a Continuation of U.S. patent application Ser. No. 17/987,349, filed Nov. 15, 2022, which is hereby incorporated by reference in its entirety.

TECHNICAL FIELD

The present disclosure relates to automated anomaly identification solutions and, in particular, systems and methods for identification of an anomaly of a block transactions graph of a blockchain over time using artificial intelligence solutions.

BACKGROUND

Blockchains add blocks to a chain after proof of work and computation of a hash of the blocks to be added by a plurality of miners of distributed nodes in a de-centralized system. However, while it is extremely difficult to change an input of a blockchain of an established block, fraudulent activities may occur and be used as input that lead to a block including fraudulent data. Accordingly, a need exists for alternative solutions to determine anomalies detecting such fraudulent activities in a blockchain.

BRIEF SUMMARY

According to the subject matter of the present disclosure, a system to identify blockchain anomalies comprises an artificial intelligence (AI) tool comprising a processor, a graphics processing unit (GPU), and a graph neural network (GNN) model, a memory communicatively coupled to the processor, and machine-readable instructions stored in the memory. The machine-readable instructions, upon execution by the processor, cause the processor to: extract one or more graph parameters from a block transactions graph of a block of a blockchain, generate one or more statistical approximations of the block transactions graph based on the one or more graph parameters, compare the one or more statistical approximations of the block transactions graph to at least one anomaly threshold, detect an irregular graph pattern in the block transactions graph when the one or more statistical approximations exceed the at least one anomaly threshold, via the GNN model, identify an anomaly within the block transactions graph based on the irregular graph pattern in the block transactions graph, via the GPU, generate an address graph based on the block transactions graph when the anomaly is identified to display one or more addresses associated with the anomaly, and generate an alert when the anomaly is identified.

According to another embodiment of the present disclosure, system to identify blockchain anomalies comprises an AI tool comprising a processor, a GPU, and a GNN model, a memory communicatively coupled to the processor, and machine-readable instructions stored in the memory that, upon execution by the processor, cause the processor to: extract graph parameters from a plurality of block transactions graphs respectively associated with blocks of a blockchain, and generate one or more statistical approximations of each block transactions graph based on the respective graph parameters. The machine-readable instructions further, upon execution by the processor, cause the processor to: detect irregular graph pattern in at least one block transactions graph when the respective one or more statistical approximations exceed at least one anomaly threshold, determine the at least one block transactions graph containing the irregular graph pattern, via the GNN model, identify an anomaly within the at least one block transactions graph based on the irregular graph pattern, via the GPU, generate at least one address graph based on the at least one block transactions graph when the anomaly is identified to display one or more addresses associated with the anomaly, and generate an alert when the anomaly is identified.

According to yet another embodiment of the present disclosure, a method to identify blockchain anomalies comprises extracting one or more graph parameters from a block transactions graph, generating one or more statistical approximations of the block transactions graph based on the one or more graph parameters, comparing the one or more statistical approximations of the block transactions graph to at least one anomaly threshold, detecting an irregular graph pattern in the block transactions graph when the one or more statistical approximations exceed the at least one anomaly threshold, via a GNN model, identifying an anomaly within the block transactions graph based on the irregular graph pattern in the block transactions graph, via a GPU, generating an address graph based on the block transactions graph when the anomaly is identified to display one or more addresses associated with the anomaly, and generating an alert when the anomaly is identified.

Although the concepts of the present disclosure are described herein with primary reference to an anomaly detection of a financial transaction environment, it is contemplated that the concepts will enjoy applicability to any setting for purposes of anomaly detection solutions, such as alternative business settings or otherwise.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

In embodiments described herein and in greater detail below, an artificial intelligence (AI) tool includes a graph neural network (GNN) tool that uses deep learning models and graphics processing units (GPUs) and is trained to analyze graphics for irregular graph patterns based on block(s) over time to detect and classify anomalies to determine whether fraud or other invalidate transaction is associated with the block at a transaction and an address level. As will be described in greater detail further below, embodiments include training the GNN tool to generate transactions graphs and address graphs to detect and classify anomalies in block information, such as anomalies due to phishing/fraud activities or other financial disturbances within a block (e.g., a sudden change in Gas price in listings within a block digital ledger). Block transaction graphs that exhibit anomalies may be clustered into targeted classifications. Once the anomaly is detected, an alert message will be sent out for further AI inspection, data analysis, and/or business usage. For example, a user may be informed that a fraudulent transaction has been attempted, and the user may then cancel the transaction. Alternatively, the AI tool itself may instruct an associated system to automatically prevent or hold the transaction including the anomaly. Transactions may involve the use of cryptocurrency, such as in the ETHEREUM platform, which is a decentralized, open-source blockchain including smart contract functionality and ETHER as a native cryptocurrency.

Figure 1:
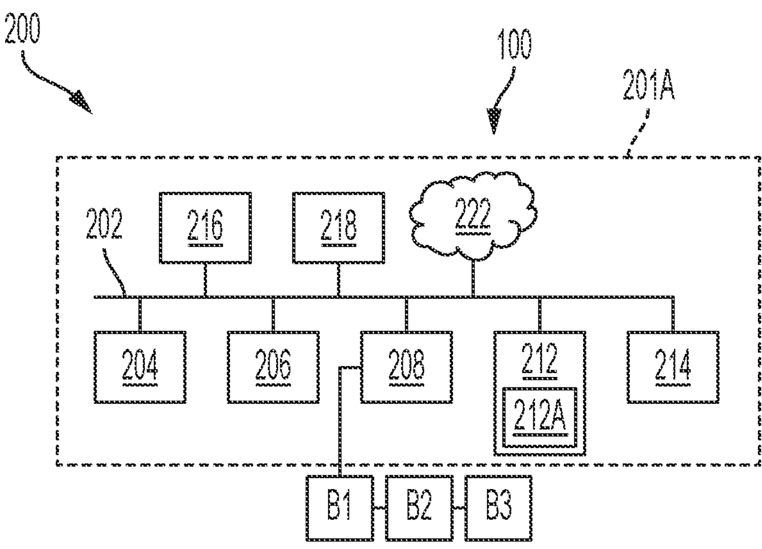
FIG. 1 illustrates a system including an artificial intelligence tool for use with a blockchain and the process flows described herein to detect anomalies in the blockchain, according to one or more embodiments shown and described herein.

Referring to FIG. 1, an intelligent anomaly detection system 200 is illustrated for use with the processes described herein, such as a process 300 of FIG. 3, as described in greater detail below. The intelligent anomaly detection system 200 comprises an intelligent anomaly detection module 201A that may be a component of the machine learning anomaly detection model to generate one or more classifications of anomalies as described in greater detail below.

The intelligent anomaly detection system 200 further comprises a communication path 202, one or more processors 204, a non-transitory memory component 206, a blockchain network including one or more nodes 208 and a blockchain including one or more blocks B1, B2, B3 of a blockchain that can be stored in each node 208, an artificial intelligence (AI) tool 212 including an AI model 212A, a storage or database 214, a machine learning module 216, a network interface hardware 218, and a network 222. In some embodiments, the intelligent anomaly detection system 200 is implemented using a wide area network (WAN) or network 222, such as an intranet or the internet. The blockchain is shown to include a primary block B1 including block data and a computed hash (from a hashing algorithm) for the primary block B1, a secondary block B2 including block data, a computed hash from the secondary block B2, and the computed hash of the previous block, and a tertiary block B3 including block data, a computed hash for the tertiary block B2, and the computing hash of the previous block. Fewer or more blocks including block data, computed hashes, and previous block hashes, are contemplated by and within the scope of this disclosure to be part of the blockchain as described herein.

The intelligent anomaly detection system 200 comprises the communication path 202. The communication path 202 may be formed from any medium that is capable of transmitting a signal such as, for example, conductive wires, conductive traces, optical waveguides, or the like, or from a combination of mediums capable of transmitting signals. The communication path 202 communicatively couples the various components of the intelligent anomaly detection system 200. As used herein, the term "communicatively coupled" means that coupled components are capable of exchanging data signals with one another such as, for example, electrical signals via conductive medium, electromagnetic signals via air, optical signals via optical waveguides, and the like.

The intelligent anomaly detection system 200 of FIG. 1 also comprises the processor 204. The processor 204 can be any device capable of executing machine readable instructions. Accordingly, the processor 204 may be a controller, an integrated circuit, a microchip, a computer, or any other computing device. The processor 204 is communicatively coupled to the other components of the intelligent anomaly detection system 200 by the communication path 202. Accordingly, the communication path 202 may communicatively couple any number of processors with one another, and allow the modules coupled to the communication path 202 to operate in a distributed computing environment. Specifically, each of the modules can operate as a node that may send and/or receive data.

The illustrated system 200 further comprises the memory component 206 which is coupled to the communication path 202 and communicatively coupled to the processor 204. The memory component 206 may be a non-transitory computer readable medium or non-transitory computer readable memory and may be configured as a nonvolatile computer readable medium. The memory component 206 may comprise RAM, ROM, flash memories, hard drives, or any device capable of storing machine readable instructions such that the machine readable instructions can be accessed and executed by the processor 204. The machine readable instructions may comprise logic or algorithm(s) written in any programming language such as, for example, machine language that may be directly executed by the processor, or assembly language, object-oriented programming (OOP), scripting languages, microcode, etc., that may be compiled or assembled into machine readable instructions and stored on the memory component 206. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Still referring to FIG. 1, as noted above, the intelligent anomaly detection system 200 in a distributed computing environment comprises nodes 208, which each may comprise a display such as a graphical user interface (GUI) on a screen of at least one computing device of a node for providing visual output such as, for example, information, graphical reports, messages, or a combination thereof. The communication path 202 communicatively couples the display to other modules of the intelligent anomaly detection system 200. The display can comprise any medium capable of transmitting an optical output such as, for example, a cathode ray tube, light emitting diodes, a liquid crystal display, a plasma display, or the like. Additionally, it is noted that the computing device can comprise at least one of the processor 204 and the memory component 206.

The intelligent anomaly detection system 200 comprises the AI tool 212 as described above to at least apply data artificial intelligence algorithms and models such as the AI model 212A as described herein, and the machine learning module 216 for providing such artificial intelligence algorithms and models. The machine learning module 216 may include an artificial intelligence component to automatically, and after the AI tool 212 is implemented, train the AI tool 212 and provide machine learning capabilities via machine learning techniques to a neural network such as the AI model 212A as described herein.

By way of example, and not as a limitation, the neural network may utilize one or more artificial neural networks (ANNs). In ANNs, connections between nodes may form a directed acyclic graph (DAG). ANNs may include node inputs, one or more hidden activation layers, and node outputs, and may be utilized with activation functions in the one or more hidden activation layers such as a linear function, a step function, logistic (sigmoid) function, a tanh function, a rectified linear unit (ReLu) function, or combinations thereof. ANNs are trained by applying such activation functions to training data sets to determine an optimized solution from adjustable weights and biases applied to nodes within the hidden activation layers to generate one or more outputs as the optimized solution with a minimized error. In machine learning applications, new inputs may be provided (such as the generated one or more outputs) to the ANN model as training data to continue to improve accuracy and minimize error of the ANN model. The one or more ANN models may utilize one to one, one to many, many to one, and/or many to many (e.g., sequence to sequence) sequence modeling. The intelligent anomaly detection system 200 may utilize one or more ANN models as understood to those skilled in the art or as yet-to-be-developed to generate disturbance labels and alerts as described in embodiments herein. Such ANN models may include artificial intelligence components selected from the group that may include, but not be limited to, an artificial intelligence engine, Bayesian inference engine, and a decision-making engine, and may have an adaptive learning engine further comprising a deep neural network learning engine. The one or more ANN models may employ a combination of artificial intelligence techniques, such as, but not limited to, Deep Learning, Random Forest Classifiers, Feature extraction from audio, images, clustering algorithms, or combinations thereof.

In embodiments, a convolutional neural network (CNN) may be utilized. For example, a convolutional neural network (CNN) may be used as an ANN that, in a field of machine learning, for example, is a class of deep, feed-forward ANNs applied for audio-visual analysis of the captured disturbances. CNNs may be shift or space invariant and utilize shared-weight architecture and translation invariance characteristics. Additionally or alternatively, a recurrent neural network (RNN) may be used as an ANN that is a feedback neural network. RNNs may use an internal memory state to process variable length sequences of inputs to generate one or more outputs. In RNNs, connections between nodes may form a DAG along a temporal sequence. One or more different types of RNNs may be used such as a standard RNN, a Long Short Term Memory (LSTM) RNN architecture, and/or a Gated Recurrent Unit RNN architecture.

In embodiments, a graphical neural network (GNN) may be utilized along with graphics processing units (GPUs). The GPUs are specialized processors to accelerate graphics renderings and create graphs based on data, and the GNN is a network processing graph inputs that may be trained to analyze the graphs and data.

The AI tool 212, the AI model 212A, and the machine learning module 216 are coupled to the communication path 202 and communicatively coupled to the processor 204. As will be described in further detail below, the processor 204 may process the input signals received from the system modules and/or extract information from such signals.

Data stored and manipulated in the intelligent anomaly detection system 200 as described herein is utilized by the machine learning module 216, which in embodiments able to leverage a cloud computing-based network configuration such as the cloud to apply machine learning and artificial intelligence or may be able to rely on an internal architecture to apply machine learning and artificial intelligence as described herein. This machine learning application may create models that can be applied by the intelligent machine learning to make it more efficient and intelligent in execution. As an example and not a limitation, the machine learning module 216 may include artificial intelligence components selected from the group consisting of an artificial intelligence engine, Bayesian inference engine, and a decision-making engine, and may have an adaptive learning engine further comprising a deep neural network learning engine.

The intelligent anomaly detection system 200 comprises the network interface hardware 218 for communicatively coupling the intelligent anomaly detection system 200 with a computer network such as network 222. The network interface hardware 218 is coupled to the communication path 202 such that the communication path 202 communicatively couples the network interface hardware 218 to other modules of the intelligent anomaly detection system 200. The network interface hardware 218 can be any device capable of transmitting and/or receiving data via a wireless network. Accordingly, the network interface hardware 218 can comprise a communication transceiver for sending and/or receiving data according to any wireless communication standard. For example, the network interface hardware 218 can comprise a chipset (e.g., antenna, processors, machine readable instructions, etc.) to communicate over wired and/or wireless computer networks such as, for example, wireless fidelity (Wi-Fi), WiMax, Bluetooth, IrDA, Wireless USB, Z-Wave, ZigBee, or the like.

The intelligent anomaly detection system 200 can comprise multiple servers containing one or more applications and computing devices. Each computing device may include digital systems and other devices permitting connection to and navigation of the network 222. It is contemplated and within the scope of this disclosure that the computing device may be a personal computer, a laptop device, a mobile smart device such as a smartphone or smart pad or tablet, or the like. Other intelligent anomaly detection system 200 variations allowing for communication between various geographically diverse components are possible. The lines depicted in FIG. 2 indicate communication rather than physical connections between the various components.

The network 222 can comprise any wired and/or wireless network such as, for example, wide area networks, metropolitan area networks, the internet, an intranet, satellite networks, or the like. Accordingly, the network 222 can be utilized as a wireless access point by any computing device to access one or more servers that generally comprise processors, memory, and chipset for delivering resources via the network 222. Resources can include providing, for example, processing, storage, software, and information from the server 220 to the intelligent anomaly detection system 200 via the network 222. Additionally, it is noted that the server 220 and any additional servers can share resources with one another over the network 222 such as, for example, via the wired portion of the network, the wireless portion of the network, or combinations thereof. While the intelligent anomaly detection system 200 is illustrated as a single, integrated system in FIG. 1, in other embodiments, the systems can be independent systems.

In embodiments, the intelligent anomaly detection system 200 of FIG. 1 may be communicatively to a "big data" environment including the database 214 configured to store and process large volumes of data in such an environment to communicate with one or more external devices, systems, or application tools across technical platforms. The database 214 may be, for example, a structured query language (SQL) database or a like database that may be associated with a relational database management system (RDBMS) and/or an object-relational database management system (ORDBMS). The database 214 may be any other large-scale storage and retrieval mechanism whether a SQL, SQL including, or a non-SQL database. For example, the database 214 may utilize one or more big data storage computer architecture solutions. Such big data storage solutions may support large data sets in a hyperscale and/or distributed computing environment, which may, for example, include a variety of servers utilizing direct-attached storage (DAS). Such database environments may include Hadoop, NoSQL, and Cassandra that may be usable as analytics engines. Thus, while SQL may be referenced herein as an example database that is used with the tool described herein, it is understood that any other such type of database capable of support large amounts of database, whether currently available or yet-to-be developed, and as understood to those of ordinary skill in the art, may be utilized with the tool described herein as well.

Figure 2:
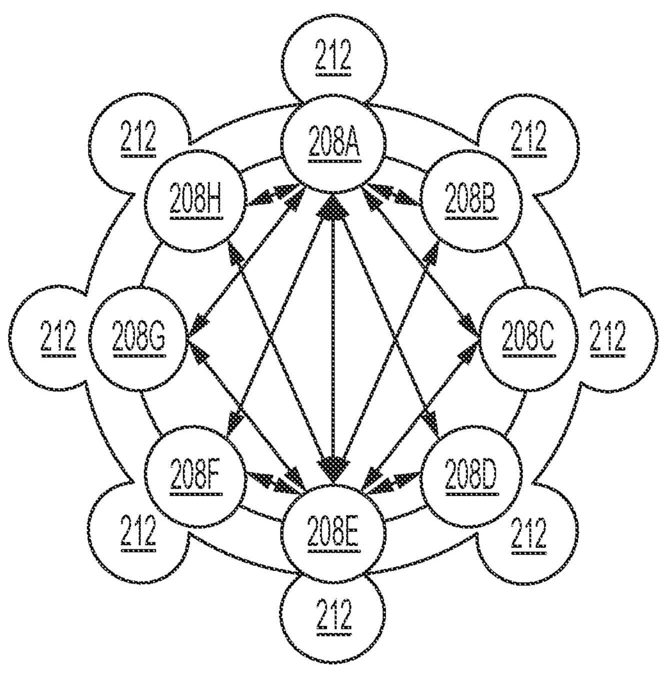
FIG. 2 illustrates a schematic of a blockchain network including one or more nodes communicatively coupled to the artificial intelligence tool of FIG. 1.

Referring to FIG. 2, a blockchain network is illustrated including a plurality of nodes 208 as nodes 208A-208H, and the AI tool 212 communicatively coupled to each node 208. The AI tool 212 may be implemented and stored within one or more of the nodes 208. Thus, the AI tool 212 may have direct access to block data memory to execute at sub-second speeds. Additionally or alternatively, the AI tool 212 may be hosted remote from one or more of the nodes 208 of the blockchain network. When remote, the GNN model may receive extracted data, such as the graph parameters extracted from the block transactions graph or block parameters extracted from a block, via one or more internet protocols. Each node 208 may be a mining node configured to conduct proof of work to validate a block and compute a hash for the block upon successful validation by the mining node.

Figure 3:
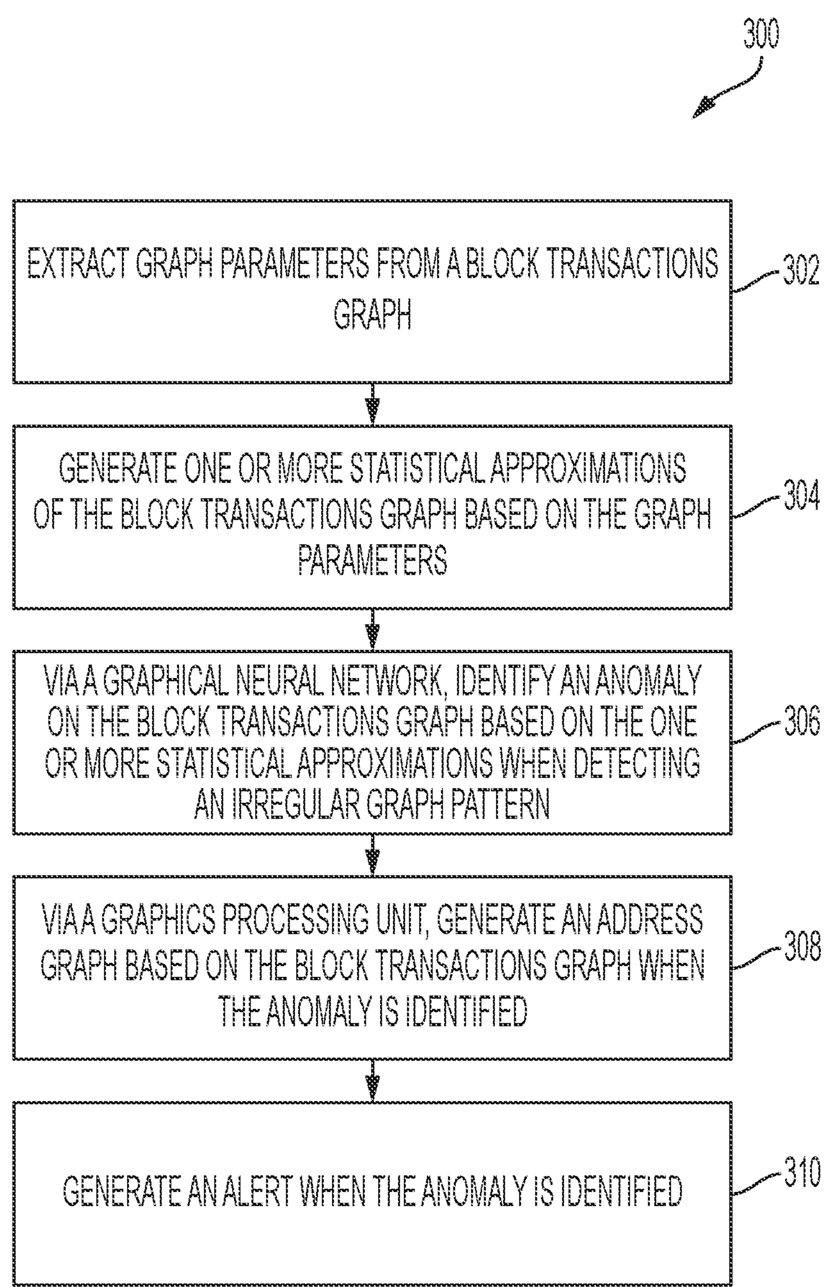
FIG. 3 illustrates a flowchart process for use of the system of FIG. 1, according to one or more embodiments shown and described herein.

Referring to FIG. 3, a process 300 is shown for use with the intelligent anomaly detection system 200 of FIG. 1. The intelligent anomaly detection system 200 of FIG. 1, used to identify blockchain anomalies, may include the AI tool 212 comprising a processor 204, a graphics processing unit (GPU), and an AI model 212A such aa graph neural network (GNN) model, a memory 206 communicatively coupled to the processor 204, and machine-readable instructions stored in the memory 206. Upon execution by the processor 204, the machine-readable instructions may cause the processor to perform a control scheme, such as the process 300 including blocks 302-310 and as further described below.

In block 302, one or more graph parameters are extracted from a block transactions graph, which is representative of all the transactions within a block. In embodiments, block data is extracted from a block of a blockchain over time (i.e., from blocks B1, B2, B3 of the block chain of FIG. 1). Via the GPU, a block transactions graph of the block may be generated based on the block data to summarize exchanges between individual transaction addresses. In particular, one or more GPUs generate transaction graphs from each block of a blockchain, and the GNN tool is trained and used to detect anomalies as irregular patterns in the transaction graphs.

The transactions graphs may summarize exchanges between individual addresses (e.g., belonging to user cryptocurrency accounts) in which pattern irregularities to identify anomalies will have a distinct construction. A graph pattern is extracted such that addresses and associated patterns are identified via graph statistical approximations to identify irregular patterns that may identify anomalies such as phishing transactions. Addresses graphs may be created if an irregular translation graph pattern is detected to single out addresses involved in and that caused the anomalies. Transactions between addresses as nodes over time may be represented on the graph. An address graph represents all the historical transactions done by an individual address, though the AI tool 212 may limit these computations to a few blocks past a current block under investigation. For example, if the AI tool 212 is computing block number 50, the AI tool 212 will only compute the addresses graphs from block numbers 49 to 45. The past blocks range may be automatically adjusted based on: (1) the number of transactions within a block and (2) the number of transactions an address has per block. A block transactions graph and/or an address graph may show a situation in which a hacker scams several real addresses to send out stolen coins to automated fake addresses controlled by the hacker, such as shown in transactions graph 408B of FIG. 4, which is described in greater detail below.

Block parameters may be extracted directly from a blockchain computing node (BCN) 208, such as from a miner's own computing unit memory. Additionally or alternatively, block parameters may be extracted from a Blockchain Archive Node (BAN). The BAN is still considered part of the blockchain network, and the BAN receives Blocks after they get processed (i.e., hashed) at BCN. A sync delay time between BAN and the blockchain network is negligible, and the BAN can be designed to host the AI model 212A as one of its native algorithms, such as part of its Operating System (OS). Block data can be received externally from the BCN and/or the BAN, and the data transportation speed can be governed by AI model's external host internet speed. The block data may come as bytes or encrypted data (such as in an 'extraData' parameter). A Data Extraction processor in the AI tool 212 may use a Python package called Web3 API to convert the block data into a Unix and/or human readable format. Another Python package called Pandas may also be used for data type conversion.

In block 304, one or more statistical approximations of the block transactions graph are generated based on the one or more graph parameters that are extracted from the block transactions graph. In embodiments, the one or more statistical approximations of the block transactions graph are compared to at least one anomaly threshold. An irregular graph pattern in the block transactions graph may be detected when the one or more statistical approximations exceed the at least one anomaly threshold. By way of example, and not as a limitation, the statistical approximations may be associated with frequency of transactions, financial amount of transactions, or combinations thereof, and a predetermined range of frequency and/or amount may be classified as normal for a block based on training of the GNN model while outlying values outside the predetermined range may be classified as an anomaly. In embodiments, an image analysis may be applied to a topology analysis of a transactions graph via the GNN to determine whether an irregular pattern exists, such as when an overlapping amount of clusters exceed a predetermined allowable threshold.

In embodiments, selected block parameters may be used in statistical approximations to produce more input features to the AI model 212A. Such statistical approximations, such as calculated probability distribution, standard deviations and means, can create dynamical features that adapt and/or scale with the dynamicity (e.g., change in time) of the block parameters, such as of a gas price's change in time as a block/market parameter.

In embodiments, graph parameters are extracted from a plurality of block transactions graphs respectively associated with blocks of a blockchain, and one or more statistical approximations of each block transactions graph are generated based on the respective graph parameters. The irregular graph pattern is detected in at least one block transactions graph when the respective one or more statistical approximations exceed at least one anomaly threshold, and the at least one block transactions graph containing the irregular graph pattern may be determined. Via the GNN model, an anomaly within the at least one block transactions graph based on the irregular graph pattern may be identified as described herein. Further, as described in greater detail below, via the GPU, an address graph may be generated to identify individual addresses involved in the identified anomaly based on the at least one block transactions graph when the anomaly is identified. In embodiments, via the GPU, a combined transactions graph may be generated based on the block transactions graphs and the one or more statistical approximations, and, via the GNN, the anomaly may be identified within the combined transaction graph based on the irregular graph pattern.

In block 306, via the GNN model, an anomaly is identified within the block transactions graph based on the irregular graph pattern in the block transactions graph. In embodiments, the GNN model is trained based on a training set of data to generate one or more classifiers of types of anomalies, and the anomaly is identified based on one of the one or more classifiers. The one or more classifiers may include a classification of a phishing anomaly, a fraud anomaly, a financial fraud anomaly, or combinations thereof. The financial fraud anomaly may be based on an extreme fluctuation over a transaction pattern threshold of gas price transaction pattern, a sell/buy transaction pattern, or combinations thereof. The GNN classifiers may be created using deep learning models with accuracy and performance benchmarks measured upon successful clustering and/or pattern recognition. The GNN classifiers may mainly be designed to operate at the block transaction level (e.g., the transaction level of a block rather than at an overall block level) where they only detect transactions graphs and addresses graphs that exhibit signs of anomalies.

In embodiments, training of the AI model 212A is based on information collected directly from blocks within the blockchain network. Historical blocks data may be collected from a blockchain archive node, cleaned, and several mathematical approximations may be carried on features of the data. Natural Language Processing may also be used to process features of the block. Machine Learning Classification Models, such as Isolation Forest, Local Outlier Factor, and K-Nearest Neighbors may be used along with Deep Learning Models, such Graph Neural Network, Neural Networks, and Autoencoders.

Regarding phishing activities, the GNN tool can create a transactions graph from a transactions list within a block and compute graph parameters to classify the block as an anomaly if it contains phishing addresses. The GNN tool can determine which address is conducting the phishing translation via training and can detect modifications that phishing address introduces to block graph parameter approximations. The GNN tool is trained on phishing addresses data that contains approximated graph parameters related to phishing activities, such as the number of transactions executed by the phishing address along with amounts values where attackers typically steal coins from different victims address and dispose the coins into multiple fake/automated accounts belonging to the attacker.

In block 308, via the GPU, an address graph is generated based on the block transactions graph when the anomaly is identified to display one or more addresses associated with the anomaly. In embodiments, the one or more addresses associated with the anomaly may include one or more addresses involved in the anomaly, causing the anomaly, or combinations thereof. Non-limiting examples of address graphs are described in greater detail below with respect to FIG. 5.

In block 310, an alert is generated when the anomaly is identified. Once the anomaly is identified, the alert may be sent out to the intelligent anomaly detection system 200, to a user associated with the block, or combinations thereof. For example, a user may be informed via a technical platform that a fraudulent transaction has been attempted, and the user may then cancel the transaction. The technical platform may include messaging technology such as a text, email, voice call, push notification on a display of a mobile smart device, or combinations thereof. Additionally or alternatively, the AI tool 212 itself may instruct an associated system to automatically prevent or hold the transaction including the anomaly.

Figures 4A, 4B:
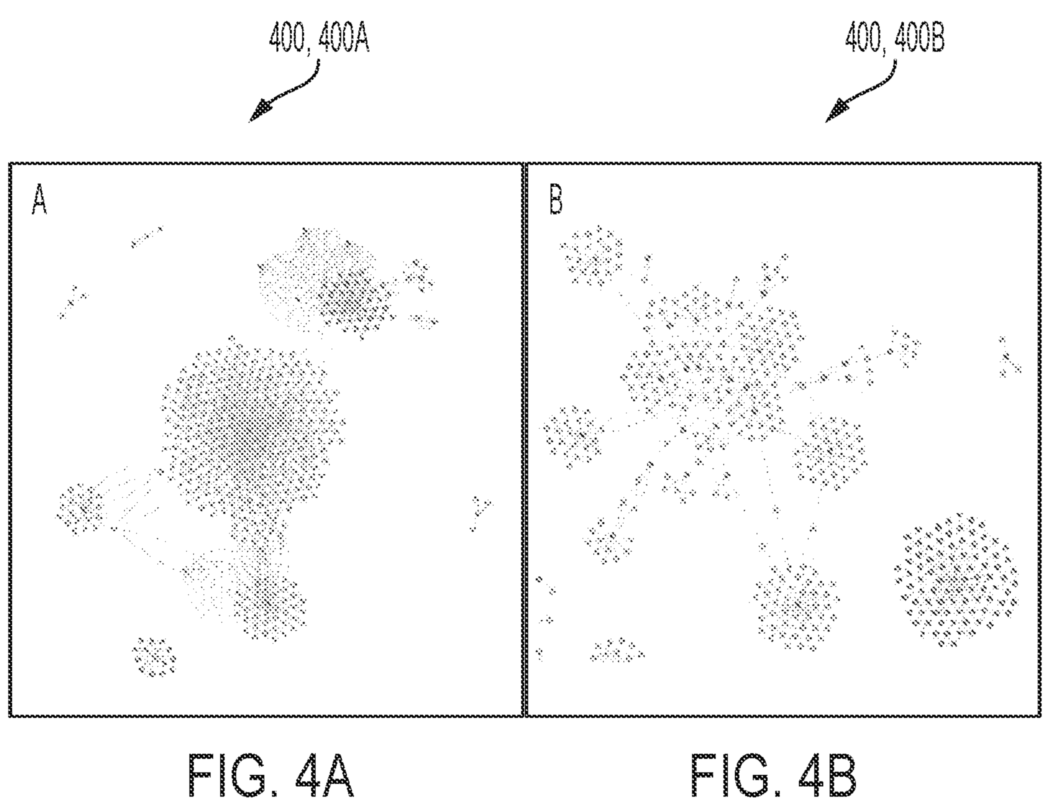
FIG. 4A illustrates a legitimate block transaction graph, according to one or more embodiments shown and described herein.
FIG. 4B illustrates an illegitimate block transaction graph, according to one or more embodiments shown and described herein.

Referring to FIGS. 4A-4B, embodiments of transactions graphs 400 are shown as a transactions graph 400A (FIG. 4A) and a transactions graph 400B (FIG. 4B). The transaction graph 400A is representative of legitimate transactions in which an irregular graph pattern and phishing is not determined. The transactions graph 400A shows traffic between legitimate users and an exchange platform for transactions being conducted therebetween. By contrast, the transaction graph 400B is representative of non-legitimate transactions of a phishing scheme showing an irregular graph pattern. In the transaction graph 400B, a hacker has scammed several addresses and has sent out stolen digital assets to fake addresses set up by the hacker. As described herein, the transaction graph 400B may have associated statistical approximations representative of frequency of transactions, financial amount of transactions, or combinations thereof, that are determined to be outside of a predetermined range of frequency and/or amount classified as normal and thus may be classified as an anomaly. The transaction graph 400A, by comparison, may have associated statistical approximations representative of frequency of transactions, financial amount of transactions, or combinations thereof, that are determined to be within the predetermined range of frequency and/or amount classified as normal and thus may be classified as normal. In additional or alternative embodiments, an image analysis may be applied to a topology analysis of the transactions graph 400B via the GNN model to determine an irregular pattern exists, such as determining that the transactions graph 400B includes an overlapping amount of clusters that exceed a predetermined allowable threshold whereas the transaction graph 400A does not (and is shown to have more separated clustering).

Figures 5A, 5B:
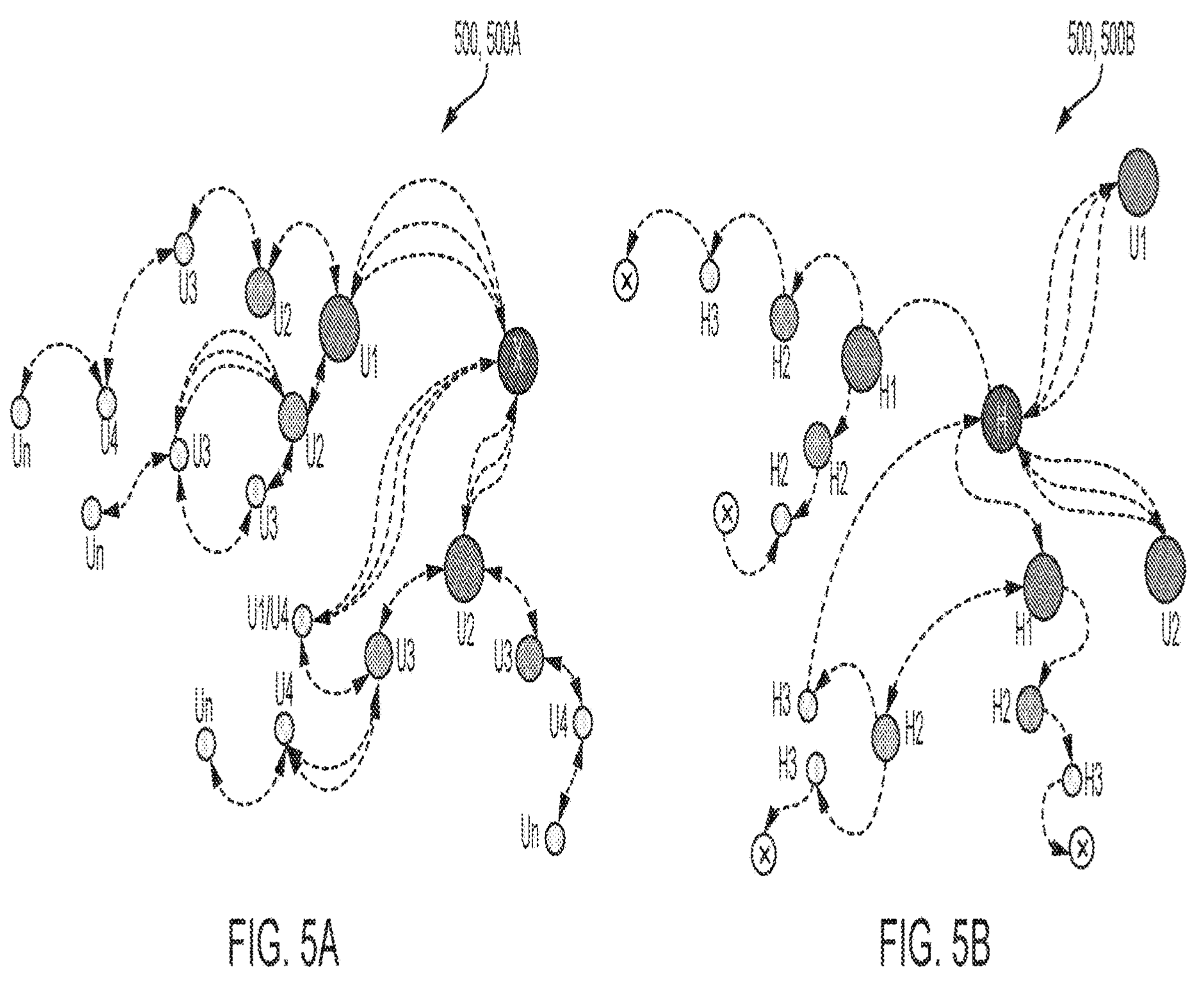
FIG. 5A illustrates a legitimate address graph, according to one or more embodiments shown and described herein.
FIG. 5B illustrates an illegitimate address graph, according to one or more embodiments shown and described herein.

Referring to FIGS. 5A-5B, embodiments of address graphs 500 are shown as an address graph 500A (FIG. 5A) and an address graph 500B (FIG. 5B). The address graph 500A is representative of legitimate transactions over a period of time, and the address graph 500B is representative of non-legitimate transactions of a phishing scheme between nodes over a period of time. In effect, address graph 500A is a schematic representation of the transaction historical records between legitimate users and an exchange platform, and address graph 500B is a schematic representation of the transaction historical records between illegitimate users and an exchange platform illustrating how a hacker will collect and distribute a stolen digital asset.

The address graph 500A shows a graph pattern for normal behavior, in which addresses of user are represented as nodes (U) with levels (1-n) based on past interactions. The past interactions can be created by tracking the user's address activity in the past hours or days via extending the current graph with data collected from previous blocks. The users represented via the nodes (U's) interact with an exchange platform (X) as well as among themselves. Multiple bidirectional lines connecting nodes (←→) indicate that the user node has several interactions with the other node (such as with a U node or an X node). Dotted lines at the end of the address graph 500A are indicative that these U nodes have more interactions in the past, but a limitation is set on extending these graphs to become further deep graphs over an extended period of time to avoid computational expense and/or excessive processing power.

In the address graph 500B, a hacking event graph is shown as indicative of an anomaly pattern. The hacker (H) collects/steals digital assets or cryptocurrencies from victims (shown as user nodes U) and distributes the stolen asset(s) across fake nodes (H'n) created by the hacker and/or group of hackers. In the address graph 500B, features that indicative an illegate transaction may involve interaction with the fake nodes shown as unidirectional (→) and a failure to create deep graph. For example, failing to create a deep graph is an indicative that most or all these H'n nodes have no interaction history. The cross node (x) at the end of the address graph 500B is representative that these cross nodes (x) have no interactions past this point. The detection system, i.e., the GNN tool, may conduct the anomaly analysis by taking into account the above two anomaly criterions of number of unidirectional transactions above a predetermined amount and amount of cross nodes ending a interaction history beyond a predetermined period of time. As an non-limiting example, a hacker may create the ending cross nodes within a week of the hacking exercise. The GNN tool may be trained to identify that transaction histories that end within a predetermined amount of time, such as within a month, two weeks, or a week, and that may be over a predetermined threshold are indicative of hacking attempts and thus may be classified as anomalies. By comparison, transaction histories under the predetermined threshold and/or ending outside of the predetermined amount of time, such as interactions over a month, may be indicative of legitimate transactions and interactions to be classified as normal.

In embodiments described herein, a GNN tool may be used to (i) generate one or more transactions graphs summarizing exchanges between individual addresses and trained to analyze graphics for irregular graph patterns based on graph statistical approximations of one or more blocks based on the block(s) and transactions over time to detect and classify anomalies to determine whether fraud or other invalid transaction is associated with the block(s) and (ii) generate address graphs when the transaction graphs indicate irregular graph patterns to single out addresses involved in the anomalies.

For the purposes of describing and defining the present disclosure, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" or "programmed" in a particular way, to embody a particular property, or to function in a particular manner, are structural recitations, as opposed to recitations of intended use.

It is noted that terms like "preferably," "commonly," and "typically," when utilized herein, are not utilized to limit the scope of the claimed disclosure or to imply that certain features are critical, essential, or even important to the structure or function of the claimed disclosure. Rather, these terms are merely intended to identify particular aspects of an embodiment of the present disclosure or to emphasize alternative or additional features that may or may not be utilized in a particular embodiment of the present disclosure.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present disclosure, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A system to identify blockchain anomalies, the system comprising:

an artificial intelligence (AI) tool comprising a processor, a graphics processing unit (GPU), and a graph neural network (GNN) model;

a memory communicatively coupled to the processor; and machine-readable instructions stored in the memory that, upon execution by the processor, cause the processor to:

extract one or more graph parameters from a block transactions graph of a block of a blockchain;

detect an irregular graph pattern in the block transactions graph, wherein detect the irregular graph pattern in the block transactions graph includes:

(i) generating one or more statistical approximations of the block transactions graph based on the one or more graph parameters, comparing the one or more statistical approximations of the block transactions graph to at least one anomaly threshold, and determining the one or more statistical approximations exceed the at least one anomaly threshold; and (ii) determining, based on the one or more graph parameters extracted from the block transactions graph, a topology of transaction clusters within the block transactions graph and determining that an overlapping amount of clusters of block transactions exceed a predetermined allowable threshold;

wherein each of (i) and (ii) independently identifies the irregular graph pattern;

via the GNN model, identify an anomaly within the block transactions graph based on the irregular graph pattern in the block transactions graph;

receive block exchange data generated from exchanges between a plurality of addresses;

via the GPU, generate an address graph based on the block exchange data to display one or more addresses associated with the anomaly by causing the GNN to:

track the block exchange data over a predetermined time, the block exchange data including data indicating directions for block exchanges between addresses;

determine behavioral patterns from the block exchange data, including at least one of:

a number of unidirectional block exchanges above a predetermined threshold for the one or more addresses;

addresses with interaction history ending within the predetermined time period;

based on determining that at least one of the behavioral patterns indicates anomalous activity, identify the one or more addresses as associated with the anomaly; and generate an alert when the anomaly is identified.

2. The system of claim 1, wherein the machine-readable instructions further cause the processor to: extract block data from the block of the blockchain over time; and generate, via the GPU, the block transactions graph of the block based on the block data to summarize exchanges between individual transaction addresses.

3. The system of claim 1, wherein the one or more addresses associated with the anomaly comprise one or more addresses involved in the anomaly, causing the anomaly, or combinations thereof.

4. The system of claim 1, wherein the machine-readable instructions further cause the processor to:

train the GNN model based on a training set to generate one or more classifiers of types of anomalies; and identify the anomaly based on one of the one or more classifiers.

5. The system of claim 4, wherein the one or more classifiers comprise a classification of a phishing anomaly, a fraud anomaly, a financial fraud anomaly, or combinations thereof, and wherein the financial fraud anomaly is based on a fluctuation over a transaction pattern threshold of gas price transaction pattern, a sell/buy transaction pattern, or combinations thereof.

6. The system of claim 1, wherein the GNN model is implemented in one or more nodes of the blockchain.

7. The system of claim 1, wherein the GNN model is hosted remote from and communicatively coupled to one or more nodes of the blockchain.

8. The system of claim 1, wherein determining behavioral patterns includes analyzing temporal interaction patterns of addresses over configurable time periods.

9. A method to identify blockchain anomalies, the method comprising:

extracting one or more graph parameters from a block transactions graph of a block of a blockchain;

detecting an irregular graph pattern in the block transactions graph, wherein detecting the irregular graph pattern in the block transactions graph includes:

(i) generating one or more statistical approximations of the block transactions graph based on the one or more graph parameters, comparing the one or more statistical approximations of the block transactions graph to at least one anomaly threshold, and determining the one or more statistical approximations exceed the at least one anomaly threshold; and (ii) determining, based on the one or more graph parameters extracted from the block transactions graph, a topology of transaction clusters within the block transactions graph and determining that an overlapping amount of clusters of block transactions exceed a predetermined allowable threshold;

wherein each of (i) and (ii) independently identifies the irregular graph pattern;

via a graph neural network (GNN) model, identifying an anomaly within the block transactions graph based on the irregular graph pattern in the block transactions graph;

receiving block exchange data generated from exchanges between a plurality of addresses;

via a graphics processing unit (GPU), generating an address graph based on the block exchange data to display one or more addresses associated with an anomaly by causing the GNN to perform:

tracking the block exchange data over a predetermined time, the block exchange data including data indicating directions for block exchanges between addresses;

determining behavioral patterns from the block exchange data, including at least one of:

a number of unidirectional block exchanges above a predetermined threshold for the one or more addresses;

addresses with interaction history ending within the predetermined time period;

based on determining that at least one of the behavioral patterns indicates anomalous activity, identifying the one or more addresses as associated with the anomaly; and generating an alert when the anomaly is identified.

10. The method of claim 9, further comprising: extracting block data from the block of the blockchain over time; and generating, via the GPU, the block transactions graph of the block based on the block data to summarize exchanges between individual transaction addresses.

11. The method of 9, wherein the one or more addresses associated with the anomaly comprise one or more addresses involved in the anomaly, causing the anomaly, or combinations thereof.

12. The method of claim 9, further comprising:

training the GNN model based on a training set to generate one or more classifiers of types of anomalies; and identifying the anomaly based on one of the one or more classifiers.

13. The method of claim 9, wherein the GNN model is implemented in one or more nodes of the blockchain.

14. A non-transitory storage medium including instructions stored thereon, the instructions, when executed by a computer system, cause the computer system to perform:

extracting one or more graph parameters from a block transactions graph of a block of a blockchain;

detecting an irregular graph pattern in the block transactions graph, wherein detecting the irregular graph pattern in the block transactions graph includes:

(i) generating one or more statistical approximations of the block transactions graph based on the one or more graph parameters, comparing the one or more statistical approximations of the block transactions graph to at least one anomaly threshold, and determining the one or more statistical approximations exceed the at least one anomaly threshold; and (ii) determining, based on the one or more graph parameters extracted from the block transactions graph, a topology of transaction clusters within the block transactions graph and determining that an overlapping amount of clusters of block transactions exceed a predetermined allowable threshold;

wherein each of (i) and (ii) independently identifies the irregular graph pattern;

via a graph neural network (GNN) model, identifying an anomaly within the block transactions graph based on the irregular graph pattern in the block transactions graph;

receiving block exchange data generated from exchanges between a plurality of addresses;

via a graphics processing unit (GPU), generating an address graph based on the block exchange data to display one or more addresses associated with an anomaly by causing the GNN to perform:

tracking the block exchange data over a predetermined time, the block exchange data including data indicating directions for block exchanges between addresses;

determining behavioral patterns from the block exchange data, including at least one of:

a number of unidirectional block exchanges above a predetermined threshold for the one or more addresses;

addresses with interaction history ending within the predetermined time period;

based on determining that at least one of the behavioral patterns indicates anomalous activity, identifying the one or more addresses as associated with the anomaly; and generating an alert when the anomaly is identified.

15. The non-transitory storage medium of claim 14, wherein the one or more addresses associated with the anomaly comprise one or more addresses involved in the anomaly, causing the anomaly, or combinations thereof.

16. The non-transitory storage medium of claim 14, wherein the instructions further cause the computer system to perform:

training the GNN model based on a training set to generate one or more classifiers of types of anomalies; and identifying the anomaly based on one of the one or more classifiers.

* * * * *